United States Patent Office 3,441,110
Patented Apr. 29, 1969

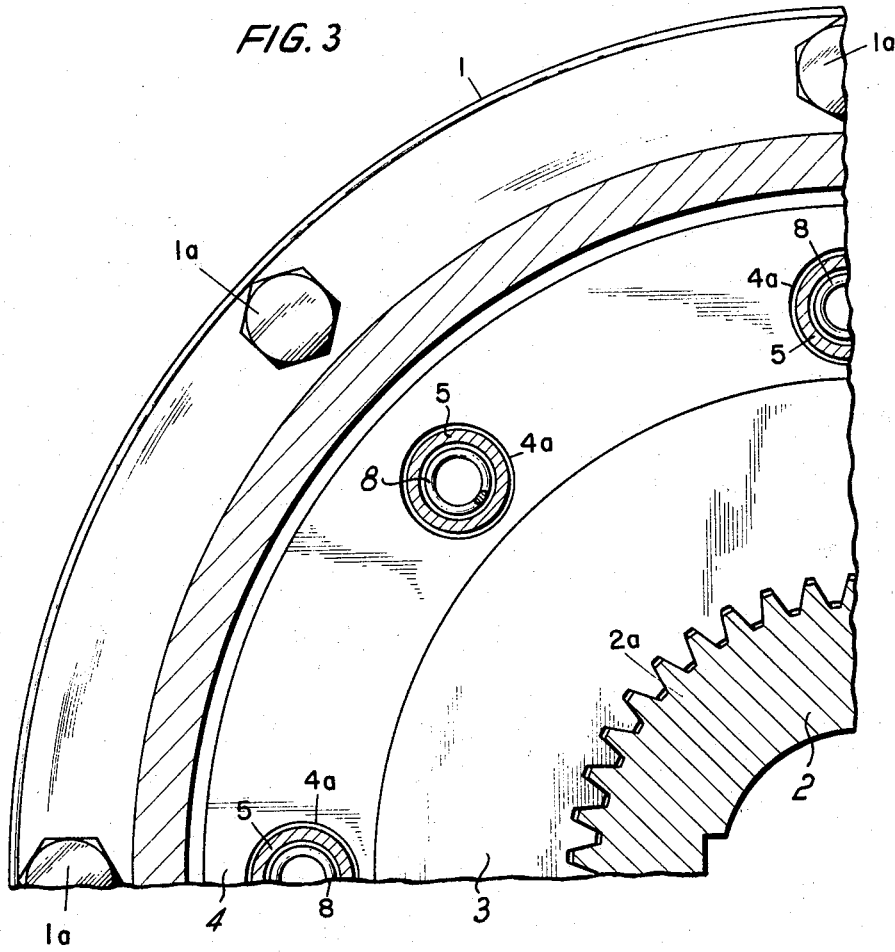

3,441,110
DISC COUPLING OPERATED BY FLUID PRESSURE
Werner Rüggen, 16 Nordstrasse,
4747 Holzwickede, Germany
Filed May 22, 1967, Ser. No. 640,008
Claims priority, application Germany, Sept. 15, 1966,
M 56,289
Int. Cl. F16d 65/24, 55/00
U.S. Cl. 188—170
6 Claims

ABSTRACT OF THE DISCLOSURE

A supercompact disc coupling operable by fluid under pressure, i.e., adapted to be engaged and disengaged, respectively, by the action of a fluid under pressure. The fluid pressure operating mechanism of the coupling is coextensive with angularly displaced rods supporting the outer discs or laminations of the coupling on the outer frame structure thereof.

BACKGROUND OF INVENTION

Field of invention

The term disc coupling is used in this context in a broad way, including all devices which are, in effect, disc couplings, e.g., disc brakes.

Such devices include an outer frame structure supporting by a system of angularly displaced rods a first stack of discs, and an inner frame structure which supports a second stack of discs interleaving with discs of said first stack. Hydraulic or pneumatic means may be and have been used to cause engagement under pressure of discs of the first stack with discs of the second stack, thus making it possible to transmit torques from the outer frame structure to the inner frame structure, and vice versa.

Description of prior art

In prior art devices of the aforementioned description the fluid-pressure-operating mechanism for causing selective engagement under pressure and disengagement of the constituent discs of the two aforementioned stacks is arranged either on the side of the coupling, or in part on the side of the coupling and in part below the coupling, or its constituent stacks of discs, respectively. This arrangement requires much space, and hence prior art couplings of the aforementioned description are relatively bulky. It is the principal object of this invention to provide fluid-pressure-operated disc couplings which are very compact.

SUMMARY OF INVENTION

Couplings according to this invention include a first stack of discs having a plurality of angularly displaced groups of registering perforations defining a plurality of angularly displaced passageways, and a second coaxial stack of discs interleaving with discs of said first stack. The couplings further include a plurality of angularly displaced rod means movable in a direction longitudinally thereof each projecting through one of said plurality of transverse passageways of said first stack. The couplings further include means for selectively causing engagement under pressure of discs of said first stack with discs of said second stack and disengagement of discs of said first stack from discs of said second stack. The aforementioned engagement under pressure causing means and disengagement causing means include a plurality of angularly displaced spring means each arranged in coaxial relation to one of said plurality of angularly displaced rod means and each engaging and biasing one of said plurality of rod means in a direction longitudinally thereof, and means for admitting fluid under pressure to an end surface of each of said plurality of rod means to overcome said bias of each of said plurality of spring means.

BRIEF DESCRIPTION OF DRAWINGS

FIG. 3 is a section along 3—3 of FIG. 1.

DESCRIPTION OF PREFERRED EMBODIMENTS

Figure 1:
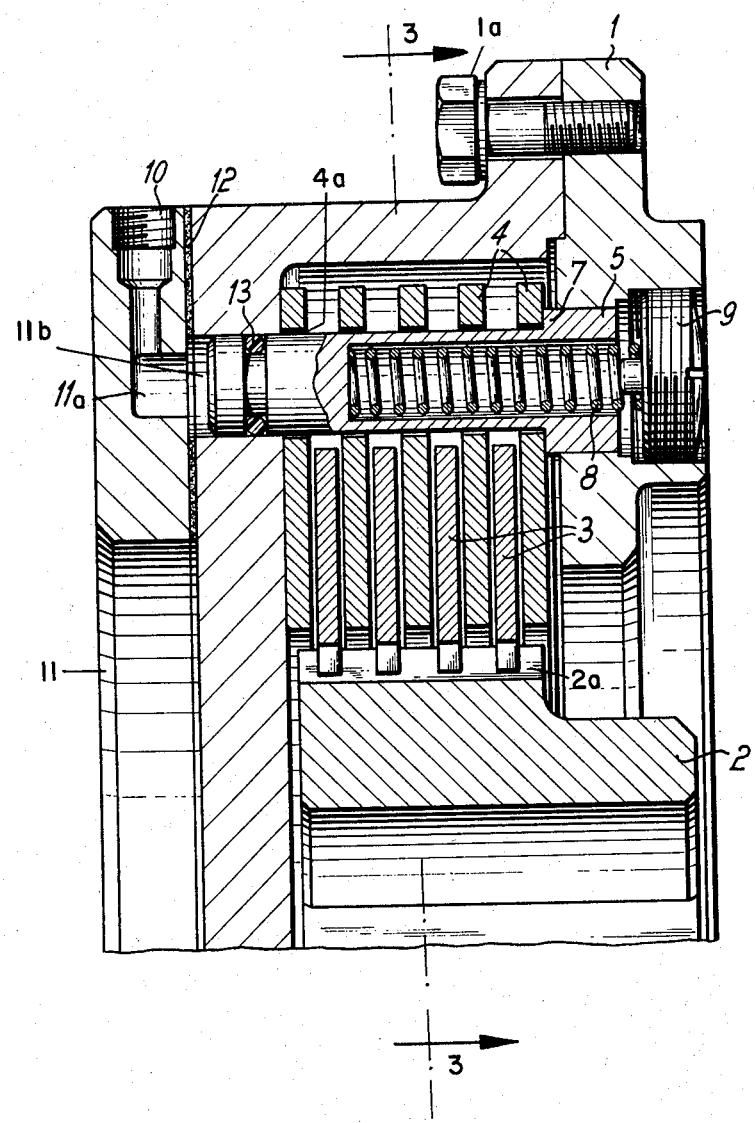
FIG. 1 is a vertical section of the upper portion of a disc coupling embodying the present invention, the lower identical portion thereof being deleted in FIG. 1.

Referring to FIGS. 1 and 3, numeral 1 has been applied to indicate a first or outer frame structure and numeral 2 has been applied to indicate a second or inner frame structure. Outer frame structure 1 includes three parts, namely a right closing member, an intermediate member secured by screws 1a to the right closing member, and a manifold body 11 secured to intermediate member by fasteners such as, for instance, screws not shown. The aforementioned inner frame structure 2 is substantially in the shape of a hub intended to be mounted on a shaft and to be keyed to said shaft so as to be jointly rotatable with the shaft. The radially outer surface of inner frame structure or hub 2 is provided with a circular system of teeth which extend in axial direction, i.e., in the direction of the axis of inner frame structure or hub 2. The stack of discs 3 is mounted on and supported by inner frame structure or hub member 2. To this end the radially inner edges of the constituent discs or laminations of stack 3 define a circular system of teeth engaging the system of teeth 2a, and thus precluding any rotary motion of the constituent discs of stack 3 relative to inner frame structure 2 about the axis thereof. Reference character 4 has been applied to indicate another or outer stack of discs. The constituent discs of stacks 3 and 4 are interleaving. The constituent discs of stacks 3 and 4 are arranged in coaxial relation and the constituent discs of stack 4 have a plurality of angularly displaced groups of registering perforations 4a. Each such group of registering perforations 4a defines a passageway which extends transversely across stack 4. A hollow rod 5 is arranged in each of the aforementioned passageways movable in a direction longitudinally of the respective rod and of the respective passageway. Hollow rods 5 are intended to operate as pistons of fluid motors. To this end, the left ends of rods 5 are closed and movable within a cylindrical space 1b defined by the left portion of outer frame structure 1. The closed ends of rods 5 are provided with circular grooves each accommodating a circular seal or O-ring-type piston ring 13. The disc shaped manifold body 11 forming the left side of outer frame structure 1 is provided with a port 10 for the admission of fluid under pressure to annular groove or manifold 11a defined by the surface of manifold body 11 juxtaposed to stacks 3 and 4. Annular groove or manifold 11a communicates with each of cylindrical spaces 1b. A gasket 12 is inserted between manifold body 11 and the portion of outer frame structure 1 situated to the right of the manifold body 11. The right ends of rods 5 are open, and helical springs 8 of which each is arranged in coaxial relation to one of rods 5 project into the open ends of rods 5 in a direction from right to left, as seen in FIG. 1. Reference numeral 9 has been applied to indicate angularly displaced screws for closing openings in the outer frame structure 1 intended for insertion of helical springs 8 into hollow rods 5. Screws 9 form abutments for the right ends of springs 8 and have projections engaging the right ends of springs 8 for centering the latter. It will be apparent from FIG. 1 that the predominant portion of the length of helical springs 8 is arranged inside of hollow rods 5, only the right ends of springs 8 projecting outside of hollow rods 5. Each of hollow rods 5 is provided with a shoulder 7 abutting under the action of one of springs 8 against the disc of stack 4 situated on the right end of stack 4. As a result, springs 8 tend to cause engagement under pressure of the constituent discs of stacks 3 and 4, and this, in turn, causes transmission of torques from the outer frame structure 1 to the inner frame structure 2, or vice versa. Admission of fluid under pressure through port 10 into manifold 11a results in action of fluid under pressure upon the closed ends of rods 5, i.e., the left end surfaces of rods 5. This pressure counteracts the forces of springs 8, causes compression of springs 8, and movement of rods 5 from left to right, as seen in FIG. 1. Hence shoulders 7 of rods 5 are moved out of engagement with the right end disc of stack 4, and there is no longer any pressure causing frictional engagement of the constituent discs of stacks 3 and 4. Consequently transmission of torques from the outer frame structure 1 to the inner frame structure 2, or vice versa, does not occur any longer.

Figure 2:
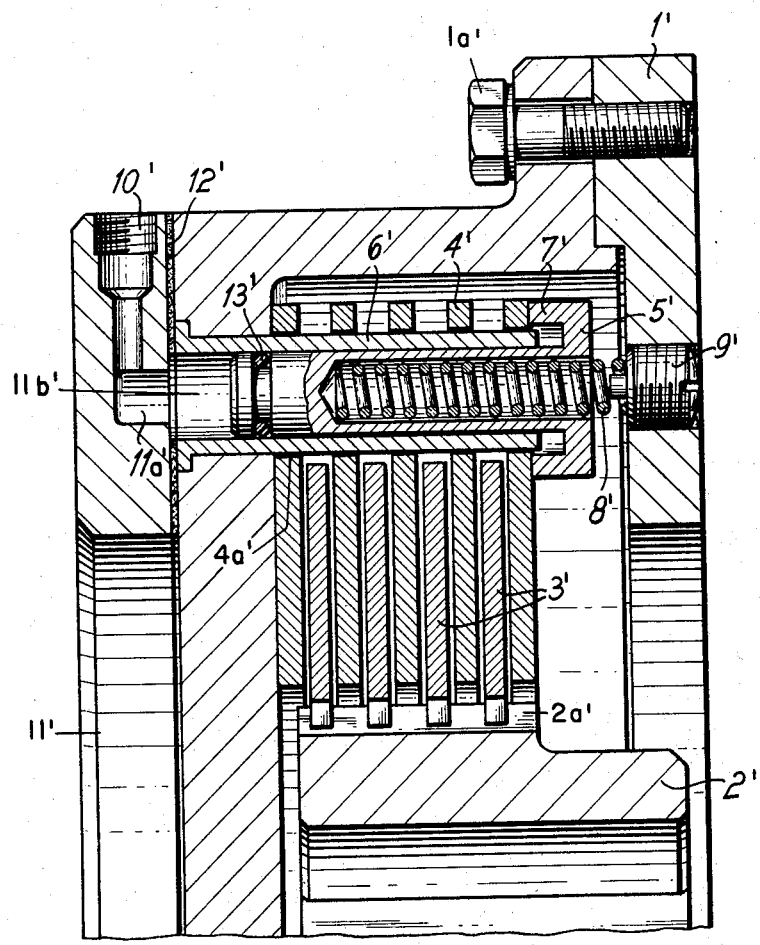
FIG. 2 is a vertical section of the upper portion of another disc coupling embodying the present invention, the lower identical portion thereof being deleted in FIG. 2.

In FIG. 2 the same reference characters with a prime added have been applied as in FIG. 1 to indicate like parts. Hence FIG. 2 calls only for an additional description inasmuch as the structure of FIG. 2 differs from that of FIG. 1.

According to FIG. 2 a sleeve 6' is inserted into each of the angularly displaced passageways 4a' and each of sleeves 6' receives one of the angularly displaced spring-biased hollow rods 5'. Hollow rods 5' are provided with abutments 7' which are the equivalents of shoulders 7 in the structure of FIG. 1. The left ends of sleeves 6' are supported by outer frame structure 1' and define cylindrical spaces 1b' housing the left closed ends of rods 5' and being supplied with fluid under pressure through admission ports 10' and manifold 11a'.

The operation of the structure of FIG. 2 is, in substance, the same as that of FIG. 1 which has been described above.

In the embodiment of the invention shown in FIG. 1 hollow rods 5 may be subjected to considerable external transverse forces. This is avoided in the structure of FIG. 2 where all external transverse forces are received by sleeves 6', and thus kept away from hollow rods 5'. Therefore the embodiment of the invention shown in FIG. 2 is preferable whenever the torques to be transmitted are of a considerable magnitude.

It will be understood that I have illustrated and described preferred embodiments of my invention, and that various alterations may be made in the details thereof without departing from the invention.

I claim as my invention:
1. A disc coupling comprising:
 (a) a first stack of discs having a plurality of angularly displaced groups of registering perforations defining a plurality of angularly displaced transverse passageways;
 (b) a second coaxial stack of discs interleaving with discs of said first stack;
 (c) a plurality of angularly displaced rod means each projecting through one of said plurality of transverse passageways of said first stack and each being movable in a direction longitudinally thereof within one of said plurality of transverse passageways; and
 (d) means for selectively causing engagement under pressure of discs of said first stack with discs of said second stack and disengagement of discs of said first stack from discs of said second stack, said engagement under pressure causing means and disengagement causing means including a plurality of angularly displaced spring means each arranged in coaxial relation to one of said plurality of angularly displaced rod means and each engaging and biasing one of said plurality of rod means in a direction longitudinally thereof, and means for admitting fluid under pressure to an end surface of each of said plurality of rod means to overcome said bias of each of said plurality of spring means.

2. A disc coupling as specified in claim 1 wherein each of said plurality of rod means is hollow and open at one end thereof and closed at the other end thereof, a preponderant portion of the length of each of said plurality of spring means being arranged inside of one of said plurality of rod means, and wherein said means for admitting fluid under pressure to each of said plurality of rod means include means defining a substantially circular manifold.

3. A disc coupling as specified in claim 1 including a manifold body arranged in coaxial relation to said first stack and said second stack and defining a circular manifold groove on the side thereof juxtaposed to said first stack and said second stack.

4. A disc coupling as specified in claim 1 wheren each of said plurality of rod means is provided adjacent one end thereof with a collar biased under the action of one of said plurality of spring means against an axially outer disc of said first stack, and wherein the end of each of said plurality of rods means remote from said collar is slidably arranged in one of a plurality of cylinders defined by an outer frame structure supporting said first stack.

5. A disc coupling as specified in claim 1 including a plurality of angularly displaced sleeve structures each projecting through one of said plurality of transverse passageways of said first stack and each accommodating one of said plurality of rod means, each of said plurality of rod means being provided at one end thereof with an abutment means biased under the action of one of said plurality of spring means against an axially outer disc of said first stack, and wherein the end of each of said plurality of sleeve structures remote from said abutment means is adapted to be supplied with fluid under pressure.

6. A disc coupling as specified in claim 1 wherein each of said plurality of rod means is hollow and each of said plurality of rod means has an open end receiving one of said plurality of spring means, and wherein each of said plurality of rod means has a closed end and defines adjacent said closed end a circular groove receiving an annular seal.

References Cited

UNITED STATES PATENTS 2,778,456 1/1957 Ross _____ 188—170
3,082,647 3/1963 Banker _____ 188—170 X DUANE A. REGER, *Primary Examiner.*

U.S. Cl. X.R.

188—72